(12) United States Patent
Kao et al.

(10) Patent No.: US 6,498,212 B1
(45) Date of Patent: Dec. 24, 2002

(54) POLYESTER COMPOSITION WITH IMPROVED HYDROLYTIC STABILITY AND METHOD FOR MAKING THE SAME

(75) Inventors: Hsin-Ching Kao, Hsinchu (TW); Lee-Hua Chen, Hsinchu (TW); Chi-Lang Wu, Hsinchu (TW); Jinn-Jong Wong, Hsinchu (TW); Szu-Yuan Chan, Hsinchu (TW); Sheng-Te Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/524,098

(22) Filed: Mar. 14, 2000

(30) Foreign Application Priority Data

Dec. 27, 1999 (TW) .............................. 8812290

(51) Int. Cl.$^7$ ............................... C08L 67/02
(52) U.S. Cl. ..................... 525/92 F; 525/175; 525/176; 525/177; 525/425; 525/437
(58) Field of Search ................. 525/175, 176, 525/177, 92 F, 437, 425

(56) References Cited

U.S. PATENT DOCUMENTS

| | | | | | |
|---|---|---|---|---|---|
| 4,066,587 | A | * | 1/1978 | Mains | 525/425 |
| 4,246,378 | A | * | 1/1981 | Kometani | 525/438 |
| 4,284,540 | A | * | 8/1981 | Iida | 525/176 |
| 4,870,110 | A | * | 9/1989 | Mehra | 521/46.5 |
| 5,206,291 | A | * | 4/1993 | Stewart | 525/173 |
| 5,436,296 | A | * | 7/1995 | Swamikanna | 525/166 |
| 5,674,943 | A | * | 10/1997 | Farrah | 525/146 |
| 5,723,520 | A | * | 3/1998 | Akkapeddi | 523/455 |

* cited by examiner

*Primary Examiner*—Patricia A. Short
(74) *Attorney, Agent, or Firm*—Darby & Darby

(57) ABSTRACT

A polyester composition with improved hydrolytic stability is prepared by heating a molten mixture of: (A) a polyester resin; and (B) 0.05–10 wt %, based on the weight of the polyester resin, of a polymeric end-capping agent having an epoxy or amino functional group.

11 Claims, No Drawings

POLYESTER COMPOSITION WITH IMPROVED HYDROLYTIC STABILITY AND METHOD FOR MAKING THE SAME

BACKGROUND OF THE INVENTION

1. Field of the Invention

The present invention relates in general to a polyester composition. More particularly, it relates to a polyester composition with improved hydrolytic stability and a method for making the same.

2. Description of the Related Arts

Polyester resins have long been used in the production of oriented articles, such as monofilaments, fibers, films, and molded parts and containers. The resins, and the articles made from them, have generally good physical properties. However, it is known that most polyesters exhibit some degree of hydrolytic instability when subjected to heat in a wet atmosphere. Under these conditions, the polyester materials can suffer moderate to severe loss of physical properties due to degradation of the polymer chains. The tendency may be explained, in part, by the hydrolysis of the ester linkages under the catalysis of the terminal acid residue of the polyester chain. In any event, it is to be appreciated that sensitivity to moisture represents a significant problem in polyester resins that significantly limit their commercial utility in applications such as in autoclaves or at elevated temperatures in humid atmospheres.

It has been proposed to enhance the hydrolytic stability of polyesters by end-capping the terminal residue with a variety of low-molecular-weight end-capping agents. For example, in Japanese Patent Application Laid-Open No. 57-49620, mono-oxyzanone is used as an end-capping agent of polyethylene terephthalate (PET). Mono-oxazoline as an end-capping agent is disclosed in Japanese Patent Application Laid-Open Nos. 61-39973, 61-48531, and 61-48532. Also, mono-epoxy as an end-capping agent is disclosed in Japanese Patent Application Laid-Open Nos. 53-112796 and 63-10731. However, modification of the polyester with these end-capping agents dose not give a satisfactory efficiency for end-capping. It has been found by the inventors of the present invention that these low-molecular-weight end-capping agents tends to decompose or evaporate during the end-capping reaction and therefore an excess amount is generally required to make up the loss.

SUMMARY OF THE INVENTION

It is an object of the invention to solve the above-mentioned problems and provide a polyester composition with improved hydrolytic stability and a method for making the same.

To attain the above object, the present invention is characterized by employing a polymeric end-capping agent which is non-volatile and thermally stable, to end-cap the terminal residue of polyesters to improve the hydrolytic stability.

The polyester composition with improved hydrolytic stability according to the present invention is prepared by heating a molten mixture of: (A) a polyester resin; and (B) 0.05–10 wt %, based on the weight of the polyester resin, of a polymeric end-capping agent having an epoxy or amino functional group.

The present method for making a polyester composition with improved hydrolytic stability comprises heating a molten mixture of (A) a polyester resin and (B) 0.05–10 wt %, based on the weight of the polyester resin, of a polymeric end-capping agent having an epoxy or amino functional group.

DETAILED DESCRIPTION OF THE INVENTION

The polyester resins useful in the present invention include those thermoplastic polyester resins which can be readily extruded to form monofilaments, fibers, films or molded articles. Such polyesters are derived from an aromatic diacid and a glycol. Examples of suitable aromatic diacids include terephthalic, isophthalic and naphthalaic dicarboxylic acid, or combinations thereof. Examples of suitable glycols include alkane diols of 2–10 carbon atoms such as ethylene glycol, butylene glycol, diethylene glycol, 1, 3-propanediol, dimethyl-1,3-propanediol, cyclohexanediol, 2-ethyl-2-butyl-1,3-propanediol, or combinations thereof.

Examples of suitable polyesters include polyethylene terephthalate (PET), polybutylene terephthalate (PBT), polyethylene naphthalate (PEN), copolymers of PET, copolymers of PBT and copolymers of PEN. A preferred polyester resin is PET.

The polyesters and copolyesters can be produced using conventional polyesterification procedures which are well known in the art. They can be formed by direct esterification of the acid, or by ester exchange with the esters of the acids, and followed by polycondensation. For example, PET may be formed from ethylene glycol by direct esterification with terephthalic acid, or by ester exchange between ethylene glycol and dimethyl terephthalate, and followed by polycondensation. It is preferable in the present invention for the intrinsic viscosity (I.V.) of the polyester to be in the range of about 0.55 to 1.5.

The end-capping agents useful in the present invention are polymeric end-capping agents having an epoxy or amino functional group. Examples of suitable polymeric end-capping agents include ethylene glycidyl methacrylate copolymers, epoxyethylene-ethyl acrylate copolymers, epoxystyrene-butadiene-styrene block copolymers, and aminopolyethylene copolymers. It is desirable in the present invention for the decomposition temperature of the end-capping agent in thermogravimetric analysis (TGA) to be greater than 400° C. The weight average molecular weight of the polymeric end-capping agent may range from about 5,000 to about 300,000, and preferably from about 10,000 to about 100,000. In comparison, conventional end-capping agents generally have weight average molecular weights only from tens to hundreds. The polymeric end-capping agent is added in an amount of about 0.05–10 wt %, based on the weight of the polyester resin. Preferably, the polymeric end-capping agent is about 0.1–5 wt %.

Other conventional additives for polyester resins can be present in the polyester composition of the invention. Such additives include stabilizers and inhibitors of oxidative, thermal, and ultraviolet light degradation; lubricants; colorants including dyes and pigments; particulate fillers; flame retardants; nucleating agents, etc.

In the process of the invention, the polymeric end-capping agent is blended with the polyester resin which has already been polymerized, to proceed the end-capping reaction. The blending of the polyester resin and the end-capping agent can be accomplished by a variety of methods which are well-known in the art. In general, the blending can be accomplished by melt blending in a closed system. For example, this can be carried out in a single- or multi-screw extruder, a Banbury mill, or a kneader at a temperature sufficient to cause the polyester blend to melt flow to proceed the end-capping reaction. Alternatively, the polymeric end-capping agent can be added to the polyester immediately after polycondensation of the polyester by injecting the polymeric end-capping agent into the polyester melt stream with appropriate mixing. In accordance with the present invention, the blending is carried out at a temperature ranging from about 265° to 290° C., and preferably from about 270° to 280° C. The blending time may range from about 0.5 to 5 minutes, and preferably from about 1 to 3 minutes.

The above polyester melt can be pelletized by using an extruder, or directly extruded to form monofilaments, fibers, films or molded articles. It is well known in the art to form polyester monofilaments by extruding polymer melt through a monofilament dye. The extruded material is then quenched, taken up and drawn. It is well known in the art to form polyester fiber by melt spinning. In general, molten polymer is fed vertically to a spinneret, drawn down and quenched with air, and converged to form a multifilament fiber. Similarly, it is well known in the art to form a polyester film by melt extrusion with various degrees of uniaxial or biaxial orientation. It is also well know in the art to form polyester parts and containers by molding. Such processes include casting, pressure molding, injection molding, extrusion molding, injection-stretch blow molding and extrusion blow molding.

The polyester articles made according to the present invention exhibit increased hydrolytic stability, compared to articles made from unmodified polyester. This is demonstrated by a smaller decrease in intrinsic viscosity of the polyester articles when immersed in boiling water.

Without intending to limit it in any manner, the present invention will be further illustrated by the following examples.

EXAMPLES 1–4

A PET prepolymer of 0.6 intrinsic viscosity was dried at 130° C. in a vacuum oven for 6 hours. The prepolymer was mixed with 0.5 wt %, based on the weight of the prepolymer, of the pre-dried end-capping agent listed in Table 1, and fed into a twin screw extruder to proceed an end-capping reaction at conditions of 150 rpm and 270° C. The polyester blend was extruded to form pellets. An intrinsic viscosity measurement was run on the polyester pellets before and after immersing the pellets in boiling water at 130° C. for 15 hours. The results are shown in Table 1.

Comparative Example

The same procedure as in the Examples 1–4 was repeated, except without adding the end-capping agent.

TABLE 1

|  | Example 1 | Example 2 | Example 3 | Example 4 | Comparative Example |
| --- | --- | --- | --- | --- | --- |
| End-capping agent | ethylene glycidyl methacrylate copolymer | Epoxyethylene-ethyl acrylate copolymer | Epoxystyrene-butadiene-styrene block copolymer | Aminopolyethylene copolymer | None |
| I.V. before the immersion | 0.60 | 0.60 | 0.60 | 0.60 | 0.60 |
| I.V. after the immersion | 0.58 | 0.57 | 0.58 | 0.57 | 0.35 |

As can be seen from Table 1, the polyesters modified by the polymeric end-capping agents exhibited much smaller decreases in intrinsic viscosity as compared to the unmodified polyester, the intrinsic viscosity of which was decreased almost by a half.

While the invention has been particularly shown and described with reference to the preferred embodiment thereof, it will be understood by those skilled in the art that various changes in form and details may be made without departing from the spirit and scope of the invention.

What is claimed is:

1. A polyester composition with improved hydrolytic stability, prepared by heating a molten mixture of:
   (A) a polyester resin; and
   (B) 0.1–5 wt %, based on the weight of the polyester resin, of a polymeric end-capping agent selected from the group consisting of epoxyethylene-ethyl acrylate copolymers, epoxystyrene-butadiene-styrene block copolymers, and aminopolyethylene copolymers, wherein the polymer end-capping agent has a weight average molecular weight of about 10,000 to about 100,000.

2. The polyester composition as claimed in claim 1, wherein said polyester resin is derived from an aromatic diacid and a glycol.

3. The polyester composition as claimed in claim 1, wherein said polyester resin is polyethylene terephthalate.

4. The polyester composition as claimed in claim 1, wherein said polyester resin has an intrinsic viscosity ranging from about 0.55 to 1.5.

5. The polyester composition of claim 1, comprising 0.5 wt %, based on the weight average molecular weight of the polyester resin, of the polymeric end-capping agent.

6. A method for making a polyester composition with improved hydrolytic stability, which comprises heating a molten mixture of:
   (A) a polyester resin; and
   (B) 0.05–10 wt %, based on the weight of the polyester resin, of a polymeric end-capping agent selected from the group consisting of epoxyethylene-ethyl acrylate copolymers, epoxystyrene-butadiene-styrene block copolymers, and aminopolyethylene copolymers, wherein the polymer end-capping agent has a weight average molecular weight of about 10,000 to about 100,000.

7. The method as claimed in claim 6, wherein said heating is at about 265° to 290° C.

8. The method as claimed in claim 6, wherein said polyester resin is derived from an aromatic diacid and a glycol.

9. The method as claimed in claim 6, wherein said polyester resin is polyethylene terephthalate.

10. The method as claimed in claim 6, wherein said polyester resin has an intrinsic viscosity ranging from about 0.55 to 1.5.

11. A polyester composition with improved hydrolytic stability, prepared by heating a molten mixture of:
   (A) a polyester resin; and
   (B) 0.1–10 wt %, based on the weight of the polyester resin, of a polymeric end-capping agent selected from the group consisting of epoxyethylene-ethyl acrylate copolymers, epoxystyrene-butadiene-styrene block copolymers, and aminopolyethylene copolymers, wherein the polymer end-capping agent has a weight average molecular weight of about 10,000 to about 100,000.

* * * * *